United States Patent
Hornung et al.

(10) Patent No.: US 12,118,230 B2
(45) Date of Patent: Oct. 15, 2024

(54) METHOD FOR PROVIDING LOGGING FOR PERSISTENT MEMORY

(71) Applicant: Micron Technology, Inc., Boise, ID (US)

(72) Inventors: Bryan Hornung, Plano, TX (US); Tony M. Brewer, Plano, TX (US)

(73) Assignee: Micron Technology, Inc., Boise, ID (US)

(*) Notice: Subject to any disclaimer, the term of this patent is extended or adjusted under 35 U.S.C. 154(b) by 64 days.

(21) Appl. No.: 18/107,694

(22) Filed: Feb. 9, 2023

(65) Prior Publication Data

US 2023/0259298 A1 Aug. 17, 2023

Related U.S. Application Data

(60) Provisional application No. 63/309,392, filed on Feb. 11, 2022.

(51) Int. Cl.
*G06F 3/06* (2006.01)

(52) U.S. Cl.
CPC .......... *G06F 3/0653* (2013.01); *G06F 3/0607* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2014/0344526 | A1* | 11/2014 | Brown | G06F 11/1458 711/141 |
| 2015/0142860 | A1* | 5/2015 | George | G06F 11/14 707/812 |
| 2015/0370498 | A1* | 12/2015 | Patel | G06F 11/1471 711/103 |
| 2019/0310796 | A1* | 10/2019 | Perez | G06F 3/0679 |

* cited by examiner

*Primary Examiner* — Khoa D Doan
*Assistant Examiner* — Edmund H Kwong
(74) *Attorney, Agent, or Firm* — Schwegman Lundberg & Woessner, P.A.

(57) ABSTRACT

Disclosed in some examples are methods, systems, memory devices, and machine-readable mediums that allows an application of a computer system to create a series of one or more logs of writes to one or more memory locations of a memory device. The logs may comprise the values at the end of the log interval of the one or more memory locations that were written to during a log interval. In some examples, the logs do not include intermediate writes to the one or more memory locations (only the final value) and do not include values of memory locations that were not written to during the interval. After an event, software can apply these logs to a copy of the original memory region state to recover the contents of the locations at any of the logged points. These logs may be useful to recreate the state of the memory at various points during the application's execution.

24 Claims, 7 Drawing Sheets

METHOD FOR PROVIDING LOGGING FOR PERSISTENT MEMORY

PRIORITY APPLICATION

This application claims the benefit of priority to U.S. Provisional Application Ser. No. 63/309,392, filed Feb. 11, 2022, which is incorporated herein by reference in its entirety.

TECHNICAL FIELD

Embodiments pertain to memory devices. Some embodiments pertain to logging data stored in a memory device in intervals.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In some examples, non-volatile memory media may be utilized to build a system with a persistent memory model.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
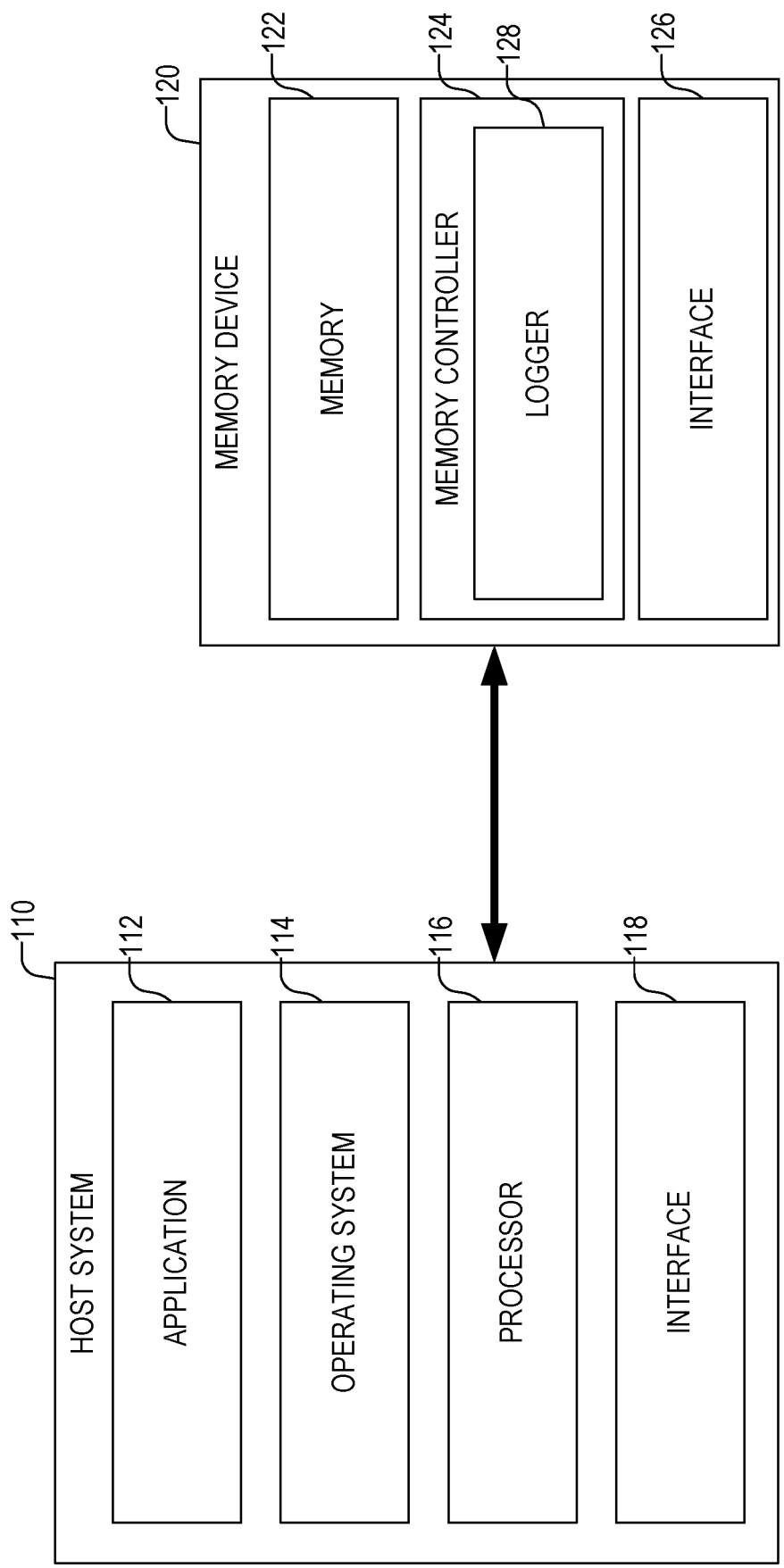
FIG. 1 illustrates an operating environment of a memory device according to some examples of the present disclosure.

Memory devices and the interfaces used to bridge these devices with other components of a computer system have gotten faster in recent years. While traditional computing architectures have utilized a very fast volatile memory connected directly to a processor for working memory and a slower non-volatile storage for storage of data that survives a power loss, the speed of these new memory devices and interfaces have opened up opportunities for new and enhanced computing architectures. Using these faster memory devices, non-volatile storage may be used more directly by other components of the host computer system. For example, non-volatile memory may be connected through a Compute Express Links (CXL) to other components to allow storage of the memory device to be shared across multiple components. For example, a storage class memory device may be used by the CPU in a manner similar to how a CPU uses RAM. CXL enables these usages through the PCIe physical and electrical interface with new protocols that allow memory and cache coherence between components.

These and other use cases of non-volatile memory enable persistent memory models which create new challenges for applications executing on these systems. For example, in the past, memory operations were completed in volatile RAM and then flushed to the non-volatile storage upon completion. This provided a method of performing computations in memory and only saving the resultant value when such calculations were successful or otherwise met one or more defined criteria. The use of non-volatile storage means that intermediate values may be stored to non-volatile storage at any point. As such, a power outage or other failure in mid-memory operation creates the possibility that the data stored in storage is in an intermediate state that is not valid. Such a state is difficult to detect and difficult to recover from without significant additional instructions and additional checks.

Disclosed in some examples are methods, systems, memory devices, and machine-readable mediums that allows an application of a computer system to create a series of one or more logs of writes to one or more memory locations of a memory device. The logs may comprise the values at the end of the log interval of the one or more memory locations that were written to during a log interval. In some examples, the logs do not include intermediate writes to the one or more memory locations (only the final value) and do not include values of memory locations that were not written to during the interval. After an event, software can apply these logs to a copy of the original memory region state to recover the contents of the locations at any of the logged points. These logs may be useful to recreate the state of the memory at various points during the application's execution, such as for debugging the application's operations.

The logs may be stored in a memory location determined by the application. The logs may be on a same memory device as the logged memory locations or may be on a different memory device in the memory system. For example, the logs may be stored on a memory having a different power plane to ensure a backup if the memory device which is being logged loses power.

In addition, rather than stop processing operations to log the memory writes at the end of a logging interval, the system may allocate swap blocks to hold any memory modifications made during the period between when a log interval ends and when the log entry generation is completed. That is, once the interval ends, the memory device keeps accepting writes at the same time the memory device is reading values of the memory locations that are logged and recording them into the log. If a write for a memory location that is being logged arrives before that memory location has had its value saved in the log, the value may be lost. One solution is to prevent the write from occurring or delay the write until the value from last interval is logged. This may slow down the memory system. Instead, in some examples, the system may allocate a mirror block to hold either the old or the new value—depending on the implementation. The system stores a copy of the data at the end of the interval in one of the mirror blocks and the newly written data in the other block. Once the logging process reaches this memory location, the copy of the data at the end of the previous interval may be saved to the log and the memory allocated to holding that data may then be reclaimed.

By not logging every transaction and every memory location, but rather only logging the changes made at the end of a logging interval, the system may utilize less memory to store the log. Furthermore, by using mirror blocks, performance impacts of writing the memory contents to the logs may be mitigated without risk that the memory may change before the log is written. The present disclosure thus solves the technical problems of increased memory usage for the logs as well as performance impacts from the logging processes associated with logging memory locations of memory devices by the technical solutions of writing the changes at the end of the interval and the use of mirror blocks.

Figure 7:
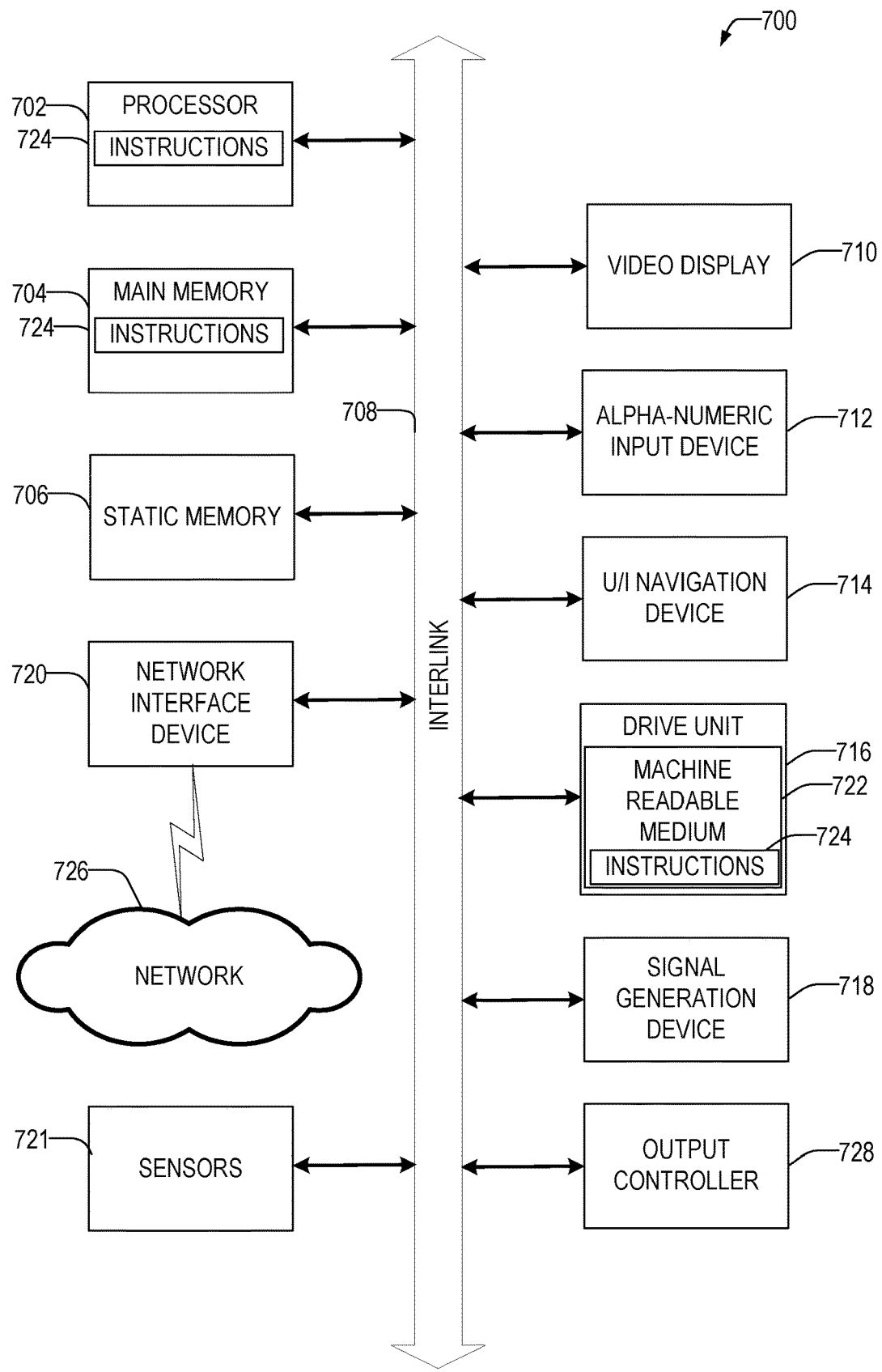
FIG. 7 illustrates a flowchart of a method of a traversal of the bit vector hierarchy according to some examples of the present disclosure.

FIG. 1 illustrates an operating environment of a memory device 120 according to some examples of the present disclosure. Host system 110 may comprise, include components of, or be integrated into, a computing device, such as shown in FIG. 7. In some examples, the host system 110 may include a processor 116 (which may be an example of processor 702 of FIG. 7). The processor 116 may include one or more caches, such as L1, L2, and/or L3 cache. Operating system 114 may interface with hardware of the host system such as the processor 116 and may provide one or more application programming interfaces (APIs) for applications, such as application 112 to interface with the hardware. Application 112 may perform one or more functionalities using the hardware and resources provided by the operating system 114. Interfaces 118 and 126 may be and/or manage a physical interface and may include one or more software and/or protocol implementations. Example interfaces may include a PCIe interface, a CXL interface, a Cache Coherent Interconnect for Accelerators (CCIX), a Coherent Accelerator Processor Interface (CAPI) interface, and the like. In some examples, the interfaces 118 and 126 may be, or may be implemented across an interconnect such as interlink 708 of FIG. 7.

Memory device 120 may include memory 122, such as NAND storage, phase change memory, and the like. Memory 122 may be an example of main memory 704, static memory 706, or drive unit 716. Memory controller 124 may be or include one or more processing units that may manage the memory 122 such as processor 702 of FIG. 7. Memory controller 124 may have volatile storage for storage of data and instructions. For example, memory 704 of FIG. 7. As an example, the memory controller 124 may include one or more logical to physical mapping tables that converts logical addresses into physical addresses on the memory 122. Other examples may include other management functions with respect to memory 122, such as garbage collection, error correction, and the like. The host system 110 and memory device 120 may implement an interface, such as a PCIe interface, a CXL interface, or the like across a physical interface or buss, such as a PCIe interface. As noted, the host system 110 may maintain cache and/or memory coherency between the host system 110 and memory device 120.

As previously noted, the system may implement logging operations for a series of log intervals. The logging operation saves, at the end of the interval, the value of memory addresses that were written to during the interval. For example, if, during log interval t1, memory at address x was modified from value a to value b, the system would state in the log that memory address x changed to value b. If memory address x does not change, then in some examples, no log of the value of this address would be created, which saves log space. In some examples, if, during log interval t1, the value of memory address x changes several times, only the ending value at the expiry of log interval t1 is logged. In other examples, one or more of the changes within an interval may be logged. In some examples, a full snapshot may be taken—that is, the memory value at the end of an interval may be logged regardless of whether it was changed during the interval or not. This may allow the application to save a "base" memory state. Future logs may then only record changes, allowing the application to use the base state, and then reconstruct the values in memory at the end of each interval by applying the subsequent changes-only logs in order until the desired point in time is reached. In some examples, a full snapshot may be taken every predetermined number of intervals. In some examples, the logging may be performed by logger 128 in the memory device 120. Logger 128 may be implemented by the memory controller 124 or may be implemented as separate hardware or software on a separate device from memory controller 124.

In some examples, all memory in the memory device may be eligible for logging. In other examples, only certain regions of memory that are marked as eligible may be logged. These regions may be configured by an administrator, by a host (e.g., an operating system of a host), may be configured by a manufacturer, or the like. Regions that are eligible for logging operations may be marked using metadata, a flag, a bit vector, or the like. A region may be a contiguous range of physical addresses. Regions may be assigned to an application or set of applications during the execution of those applications. For example, one or more regions may be assigned to application 112 of FIG. 1. In some examples, multiple individual memory regions may be combined to form larger pools of memory.

Memory regions may then be subdivided into one or more extents. Extents may be contiguous ranges of physical addresses within a region. Extents may be combined in a list and may have gaps between them. Extents may be software-requested memory objects that may be used for operations utilizing logging. In some examples, software may only be interested in logging certain extents and may not be interested in a log of the entire region. These extents that are to be logged may be specified by the application software as a list of extents that are passed to the memory device to setup the logging. In some examples, extents may be aligned on 64-byte (B) boundaries.

Log intervals are identified by a log interval identifier or number which serves as a unique identifier associated with the interval of time in which writes are logged. Interval start and stop points are indicated to the memory device by the application software. This allows the intervals to be flexible to the needs of the application software. For example, for more sensitive code, the application software may specify a shorter interval to capture more granular changes to memory. For less sensitive code, to preserve log memory, the application software may specify longer intervals. As such, intervals may be specified by the application software to be regular intervals, irregular intervals, or the like. A first interval may be a same or different time period than a second interval. In some examples, the log interval number may be incremented by one for each new log interval. In some examples, the log interval number may be set by the memory device.

An application, such as application 112 may begin logging and specify the start and stop of one or more intervals. For example, the application may call one or more functions provided by an operating system, such as operating system 114 and/or provided by the memory controller 124. The functions may then send one or more commands to the memory device (e.g., to a memory controller 124). These functions may be used by the software to initialize the logging, specify extents to log, provide a memory buffer location to the hardware to store the logs, specify a start of an interval, specify a stop of the interval, and the like.

As an example, the following functions may be defined:
Log_allocate(Region) returns compStat This function may initialize the hardware's copy of state for logging in the region. The return value is a completion status.
Log_start(extentPAddr) this function may initialize metadata for the memory in an extent list whose header is located at extentPAddr. The function may also flush all data associated with the memory addresses in the extent list to main memory.
Log_interval(extentPAddr, log PAddr, bufSize) returns Log Int This function may start a new log interval for extents in the extent list PAddr, flush all data associated with the extents to memory, and store the log at the address pointed to by the parameter log Paddr. The function returns a completion status. For example, whether the operation completed successfully. If the previous log interval is not complete, the Log Int may be −1. The function may also return an error status from the flush operation (if any). In some examples, while an operating system may process this command, in other examples, the memory may be virtualized and this command may bypass the operating system and be sent directly from the application to the logger (e.g., logger 128). This may decrease logging overhead as seen from the application.

During a particular interval, the system may track memory addresses within logged extents that have changed during the interval. This indication may be stored in metadata. Also, during the particular interval, the memory within the extents and write modifications that occurred in the immediately previous interval may be written to the specified log location. The log status may be put into a control status register (CSR) when complete or if the next log write will overflow the log buffer. In some examples, an interrupt may be generated when the memory device writes the status CSR. In the examples in which a buffer overflow is imminent, software may be provided with a function to provide an additional buffer for the memory device log generator. For example, a function such as: Log_buffer(log Paddr, bufSize) where log Paddr is a pointer to the additional buffer and bufSize indicates the size. In some examples, the hardware may also provide a function to check the CSR. For example: Log_status(log PAddr) returns a completion status compStat; log PAddr may be a pointer to a log memory location and compStat may be one of the following values:

| Value | Name | Description |
|---|---|---|
| 0 | Success | The log has completed successfully |
| 1 | BufferFull | The current buffer has filled before the log is complete. More buffer space is required to proceed. |
| 2-14 | Reserved | |
| 15 | Fail | Log generation has failed |

As noted, the memory device tracks the history of memory writes within extents selected for logging. In some examples, this is tracked at a cache-line granularity. Once the interval ends, the system records the ending values of all memory locations (e.g., cache lines) within the extents that were modified during the interval into the log memory provided by the software. To avoid performance impacts, the system may continue with memory writes and accesses (e.g., in a new interval). For example, if a first memory location in a first interval is modified during the first interval and is subsequently modified during a second interval (after the first interval is closed) before the modified of the first interval is logged to the log file, this second write triggers allocation of a "Mirror Block" of the same size associated with the written memory location and storing the value of the first memory location before the subsequent write. Mirror blocks are allocated within a set of regions specified by the application. The mirror block contains the previous interval version of modified lines within the block. In some examples, a memory block (e.g. 256B) may contain multiple memory lines (64B each). When the logging process reaches the first memory location, metadata associated with the location and the logging operation indicates that the logging process is to use the data stored in the mirror block. In other examples, the mirror block may store the newly written value and the logging operation may use the original block. The mirror block may then be treated as the new memory block for future write operations.

As previously mentioned, in some examples, memory logging may be available only in extents from certain memory regions. In these examples, memory regions may have a transactional attribute that specifies whether logging is available. In some examples, regions may be reserved as chunks of memory with a constant size (e.g. 256 MB, 4 GB, 16 GB, 64 GB or 256 GB), with a limited number per device. In one example, enough space is reserved for a complete set of mirror blocks, which may be a 50% capacity overhead. The on-demand mirror block allocation scheme may limit the capacity overhead to only those pages written to after a transaction begins. By not logging the write history of every address, the memory capacity requirement is bounded. Moreover, this architecture works for small/short running transactions and large/long running transactions (e.g. HPC checkpointing). In some examples, a table in the memory device may contain an entry for each memory region for which logging is enabled. The table indicates the attributes for each region, and which regions have been combined to create an allocation pool.

In some examples, each memory line (e.g., 64B) may have metadata associated with it for saving logging information. In other examples, metadata may apply to other sizes or granularities of memory. The metadata may store information about two logging intervals—a current interval and a previous interval. For ease of description these are referred to as an "even" interval (e.g., intervals with interval ids that are even) and an "odd" interval (e.g., intervals with interval ids that are odd). If the current interval is odd, the metadata for the even interval will be storing data for the previous interval. If the current interval is even, the metadata for the odd interval will be storing data for the previous interval. The follow is an example of metadata used for the logging information:

- L Bit—The line is part of a log extent list. This enables the use of the remaining meta-bits on a line-by-line basis.
- W bit—Tracks if a host reads a line with write permission.
- L0 (Log 0) bit—Tracks if a write was received for the line during an even log interval.
- L1 (Log 1) bit—Tracks if a write was received for the line during an odd log interval.

In some examples, the present logging operations may utilize 3 bits of metadata for each 512 bits of data in the media. These bits may be stored in reserved data lines or may be stored in metadata of the media. Separate data storage for these bits may provided enhanced performance as the bits are expected to be sparse.

As noted, a Control/Status Register (CSR) Log Interval Number (log Int) is initialized by software. Each time software signals a new logging interval has started the log interval number is incremented. The least significant bit of this number determines if memory writes are logged via the L0 meta-state bit (if least significant bit of the number is 0) or the L1 meta-state bit (if the least significant bit of the number is 1).

As write requests arrive, the address is used to determine if the write is directed to a memory region where logging is allowed. If the address of the request is a part of a region where logging is allowed, the write address is used to index into a metastate structure to determine if the memory address is part of an extent that has logging enabled. If the memory address is part of an extent that has logging enabled, the system may read the current state of the line stored in the metadata. If both L0 and L1 are clear, the current logging interval number is used to set either L0 or L1 (depending on whether the interval number is odd or even) and the write is forwarded to the media. If the metadata bit (L0 or L1) selected by the log interval number is already set, the metadata is unchanged, and the write is forwarded to the media. If the other bit is set and the bit selected by the log interval number is clear, the current contents of the address in the media is read before the bit selected by the log interval number is set and the write is forwarded to the media. In this last case, the block pointer is also read from the metadata. If it is NULL, a new block is allocated and the address for that block is written into the meta-state. The data read from the media before the write is then written to this block using the cache line offset (least significant 2 bits if the blocks per meta-data bit vector is 4). If a block is not available (block pointer was originally NULL and the free block list is empty) the current media value is dropped, and a logging block exhaustion event may be signaled. In response to a logging block exhaustion event, the application may truncate the interval, establish a new copy of memory and allocate more logging blocks, or the like.

When software starts a new log interval the logger begins creating a log for a previous interval by pulling all modified data from caches using a read current transaction to each line where the processor has write-permission before responding to the start interval command. This can be done via a snoop filter state or by setting the logging metadata W bit.

The logger then walks the metadata for memory locations within the memory region and creates the interval change log. For an example of this change log see FIG. 3. The interval number is written to the log buffer and the buffer CRC generator is initialized. The memory device increments through the metadata for each corresponding memory location looking for a set L0 or L1 bit corresponding to the previous interval. If only the previous interval L0/L1 bit is set the metadata is used to generate a media address (also called a device physical address or DPA). The media is read and both the DPA and memory data are written to the log buffer. If both L0 and L1 bits are set, the metadata log block pointer is accessed and used to read the memory data before both the DPA and data are written to the log buffer. The previous interval L1 or L0 bit is cleared. If there are no other memory locations stored in the buffer, the buffer is freed, and the log block pointer is written with NULL. Each time the log buffer is written the values are included in a Cyclic Redundancy Check (CRC). When all lines in the region have been checked and all previous interval L bits have been cleared the CRC is written to the log buffer and completion is signaled to software. If software attempts to start a new log interval before the log walker state machine has completed the prior log, the attempt fails, and software is expected to re-issue the start.

The following example illustrates the logging operation and the associated metadata states for a memory location.

| (L, W, L0, L1) | Operation | Description |
|---|---|---|
| 1000 | Even Interval | Initial state, start even interval 0 |
| 1000 | Log Interval | Logger starts an interval, no line operation performed. |
| 1100 | Mem Read | The memory location (e.g., the memory line) was read with write permission. W bit is set as a result. |
| 1110 | Mem Write | The memory location was written during an even interval, Host retains write permission. L0 bit is set as a result. |
| 1110 | Odd Interval | Start odd interval 1. All modified data from interval 0 in memory locations defined by the vector of extents recalled to memory. Return 1 and begin logging of interval 0. |
| 1100 | Log Write | The logger has read the even interval data for the memory location and generated the log. The processor retains write permission of the memory location. L0 bit is cleared because the logger has read the data. |
| 1001 | Mem Write | The line was written during odd interval 1. Host gave up write permission. W bit is cleared because the host gave up write permission. L1 bit is set because a write happened during the odd interval 1. |
| 1001 | Even Interval | The even interval 2 has started. All modified data from interval 1 recalled to memory. Return 2 and log generation for odd interval 1 starts. |

-continued

| (L, W, L0, L1) | Operation | Description |
| --- | --- | --- |
| 1101 | Mem Read | The line was read with write permission. As a result, the W bit is set. The logger has not reached the memory location. |
| 1111 | Mem Write | The memory location was written during the even interval. The memory device copies the L1 data to a mirror location. Logger has not reached the memory location. |
| 1110 | Log Write | Logger finds L0 and L1 bits set; as a result, it reads the mirror memory location and adds the value to the log; finally, it clears the L1 bit. Host retains write permission. |
| 1110 | Odd Interval | The Odd interval 3 has started. All modified data from interval 2 recalled to memory. Return 3 and begin logging of interval 2. |
| 1111 | Mem Write | The memory location was written during the odd interval. Logger copies L0 data to mirror location to enable logging. Logger has not reached the line. |
| 1101 | Log Write | The logger reaches the memory location and finds both L0 and L1 set, reads the mirror location, generates the even log, and clears the even bit. |
| 1001 | Cache Evict | The processor evicts the memory location and gives up ownership. |
| 1001 | Even Interval | The even interval 4 has started. All modified data from interval 3 recalled to memory. Return 4 and log generation for odd interval 3 starts. |
| 1000 | Log Write | The logger has read the odd interval data for the memory location and generated the log. |

Figure 2:
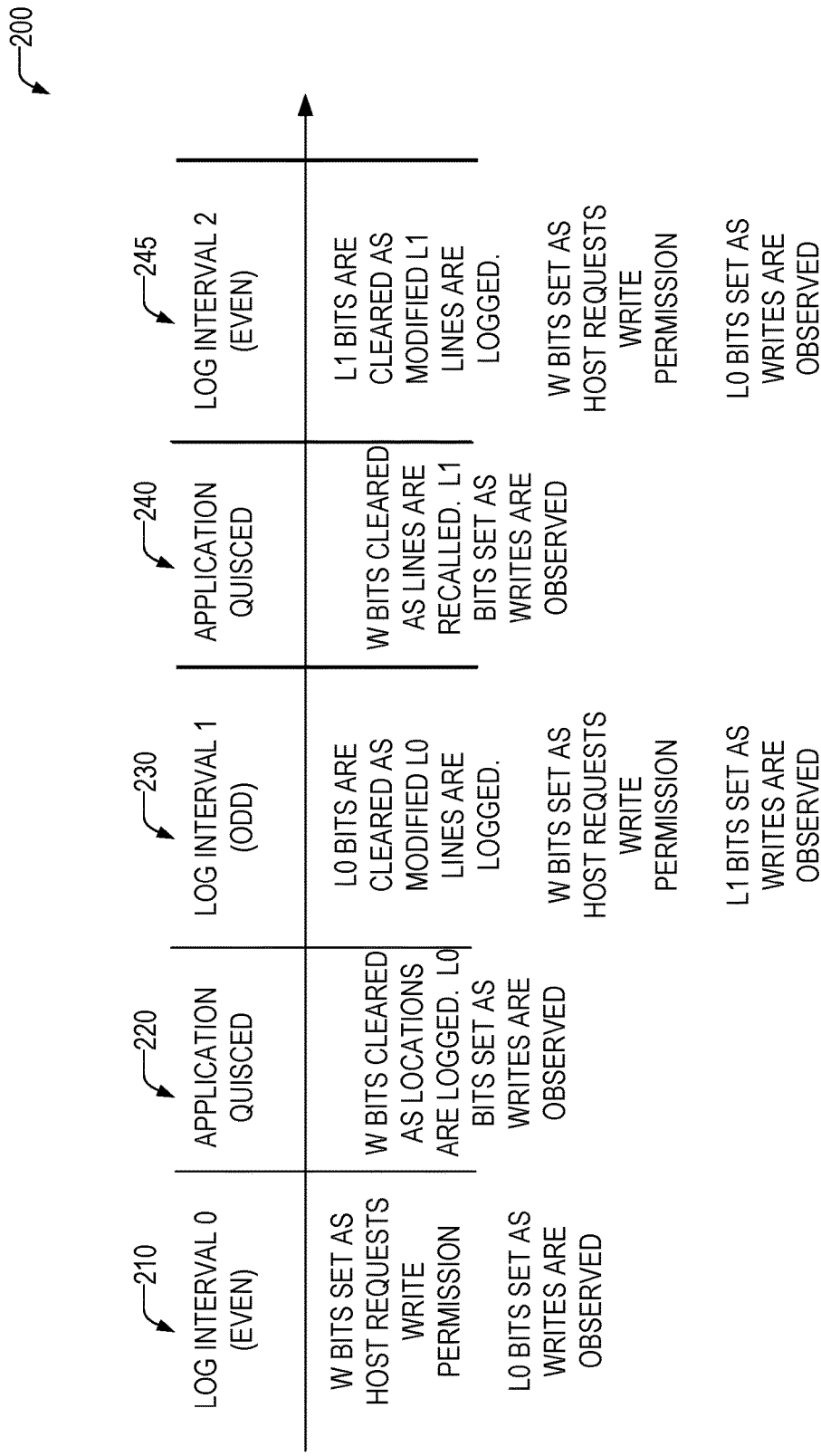
FIG. 2 illustrates a timeline with three logging intervals according to some examples of the present disclosure.

FIG. 2 illustrates a timeline with three logging intervals according to some examples of the present disclosure. At log interval 0 (an even interval) 210, W bits are set for metadata for particular memory locations as the host requests write permission on memory in the particular locations. L0 bits are set for metadata for particular memory locations as the host writes to the particular memory locations. After log interval 0 is over, the application is quiesced at point 220. During this time, the W bits are cleared as memory locations are saved to the log of interval 0. During this point, L0 bits are still set as writes are observed. These bits are set even though interval 0 is over as the write was prior to the expiration of the interval and is a result of flushing the cache.

At point 230, log interval 1 begins. L0 bits are cleared as the memory locations are logged. W bits in the metadata for a particular location are set as the host requests write permission for the particular location. Similarly, L1 bits are set for metadata corresponding to a particular location as writes are observed for those locations. At point 240, the application once again quiesces. During this time, W bits are cleared as lines are recalled, and L1 bits are set as writes are observed as a result of these recall operations. At point 245, the log interval 2 begins. L1 bits for metadata corresponding to a memory location are cleared as the modified L1 locations are logged. W bits are set metadata corresponding to a particular location as the host requests write permission for those locations. L1 bits for metadata corresponding to a particular memory location are set as writes to those locations are observed.

Figure 3:
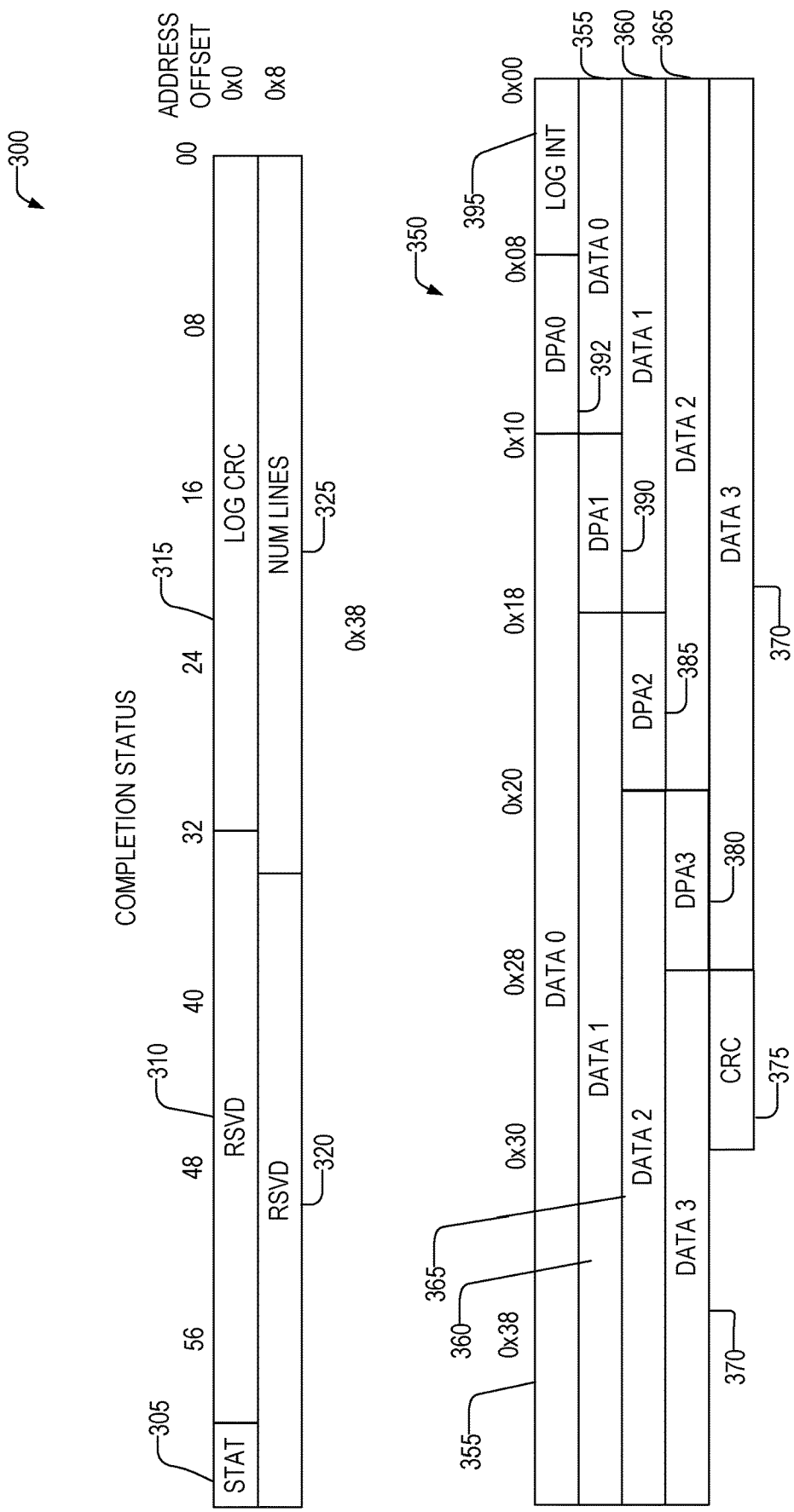
FIG. 3 illustrates a completion status register (CSR) layout and a log layout structure according to some examples of the present disclosure.

FIG. 3 illustrates a completion status register (CSR) layout 300 and a log layout structure 350 according to some examples of the present disclosure. CSR layout includes a status field 305 that indicates a status of the last logging interval, e.g., the completion status (compStat) value described above. RSVD 310 and 320 are reserved locations for future information. Log CRC 315 is a cyclic redundancy check that stores the CRC of the log for the interval. This may be compared with the CRC read from the log itself to ensure that this CSR corresponds to a log read from the log memory. Num Lines 325 contains the amount of data read from the memory device—e.g., the number of memory lines that changed during the interval. Application software may use the number of memory lines to calculate the length of the log in memory and therefore find the CRC value to determine if the log has been corrupted.

Log layout structure 350 illustrates a log structure of four memory locations (memory lines) according to some examples of the present disclosure. Data 0 355 is the data stored at the memory location identified by the physical address DPA0 392 at the end of the interval given by Log INT 395. Data 1 360 is the data stored at the memory location identified by the physical address DPA1 390 at the end of the interval given by Log INT 395. Data 2 365 is the data stored at the memory location identified by the physical address DPA2 385 at the end of the interval given by Log INT 395. Data 3 370 is the data stored at the memory location identified by the physical address DPA3 380 at the end of the interval given by Log INT 395. CRC 375 is the cyclic redundancy check of the rest of the log layout structure 350. In some examples, more or fewer data lines and addresses are written to the structure depending on how many changes are observed at the end of the log period. In other examples, chunks of a predetermined number of changes are bundled together in the structure such as that shown (which may be four as shown, or more or fewer) and the structure may be repeated if necessary.

The CSR and/or the log layout structure 350 may be written to a same memory device or a different memory device as each other. The CSR and/or the log layout structure 350 may be written to a same memory device or a different memory device as the memory that is being logged. For example, the log layout structure 350 may be written to a persistent memory device (e.g., storage such as a NAND storage), a different volatile storage, or the like while the completion status 300 may be written to host attached media. In some examples, the log layout structure 350 may be written to a memory address for a memory device within a different power plane than the memory device being logged. This means that if the power is lost on the memory device being logged, that the log will not be affected.

Figure 4:
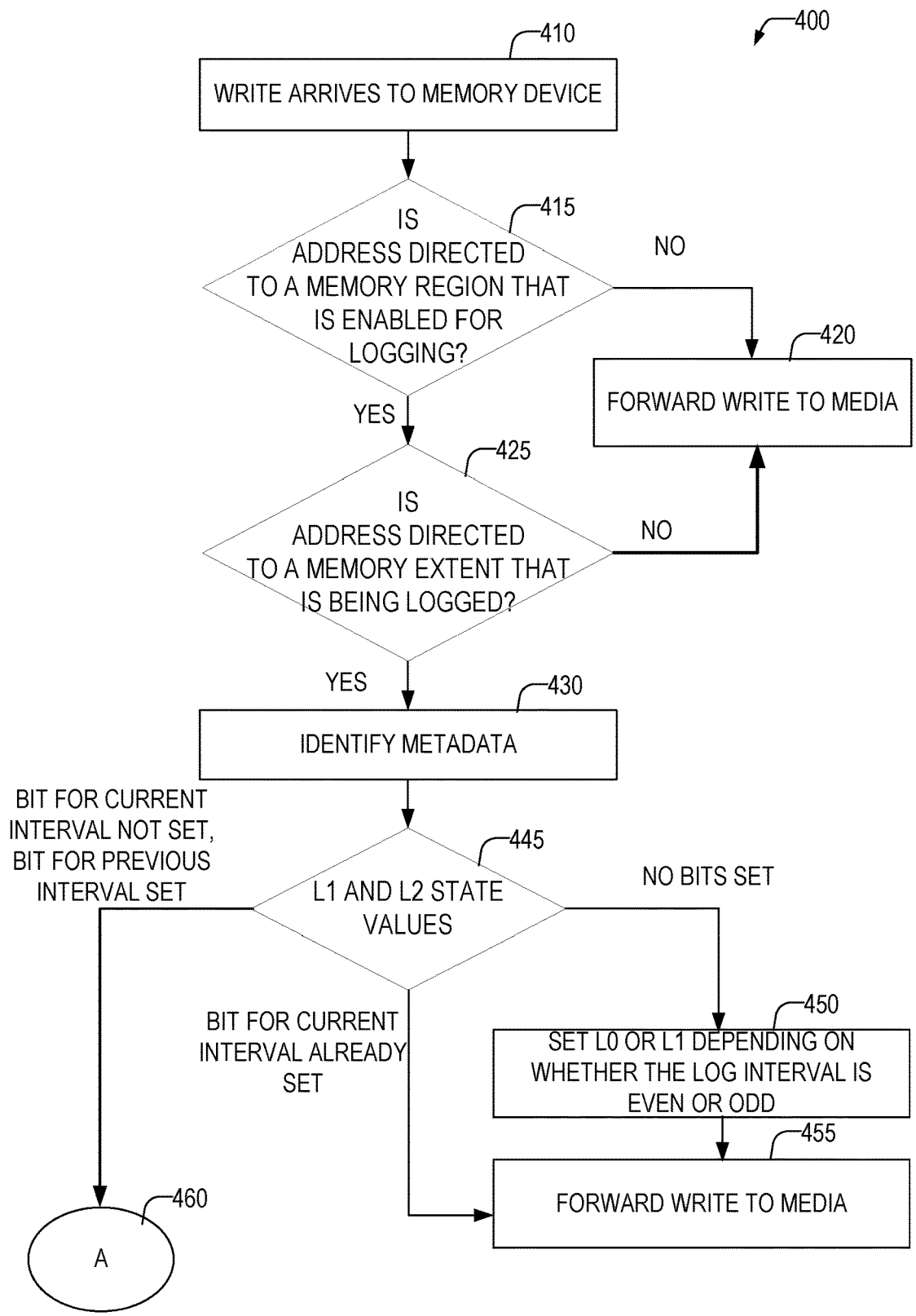
FIG. 4 illustrates a flowchart of a method of handling write operations in a system supporting logging changes to a memory device according to some examples of the present disclosure.

FIG. 4 illustrates a flowchart of a method 400 of handling write operations in a system supporting logging changes to a memory device according to some examples of the present disclosure. At operation 410 a write arrives to a memory device, the write may include a physical or logical address. If the write includes a logical address, the memory device may convert the logical address to a physical address. At operation 415 the memory device determines whether the physical address is a physical address that is part of a memory region that has logging enabled. If the answer is NO, then at operation 420, the write may be forwarded to the media. If the answer is YES, then at operation 425, the memory device determines whether the address is part of an extent that is being logged. If the address is not directed to an extent that is being logged, then the memory write is forwarded to the media at operation 420. In some examples, the physical address may be used to determine metadata, which may indicate whether the memory address is being logged.

If the write is directed to an extent that is being logged, then at 430, the address of the write request is used to identify the metadata corresponding to that memory location. In some examples, this was already done at operation 425 to identify whether the address is directed to a memory location that is being logged. At operation 445, the L1 and L2 state values are determined. If the bit for the current interval (either the even L0 bit, or the odd L1 bit depending on the interval number) is set, then a previous write was already processed. Even if the bit for the previous interval was set, because a previous write in the current interval handled that scenario, the write is forwarded to the media at operation 455.

If no bits are set, then at operation 450, the L0 or L1 bits are set depending on whether the log interval number is odd or even. For example, when the log interval number is odd—the L0 bit is set; when the log interval number is even the L1 bit is set (or vice versa). Flow proceeds to operation 455 where the write is forwarded to the memory cells for writing to the media. If the bit for the current interval is not set, but the bit for the previous interval is set, then flow proceeds to "A" 460, which is described in FIG. 5.

Figure 5:
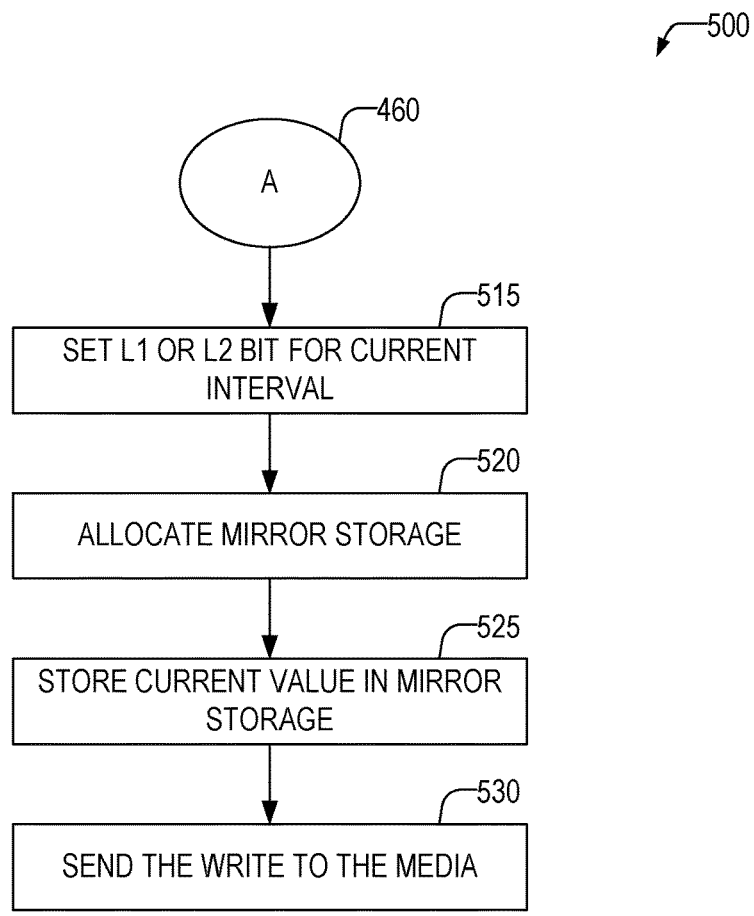
FIG. 5 illustrates a method of processing a write when logging is enabled and when a previous interval bit is set with the current interval bit not being set according to some examples of the present disclosure.

FIG. 5 illustrates a method 500 of processing a write when logging is enabled and when a previous interval bit is set with the current interval bit not being set according to some examples of the present disclosure. Method 500 continues from 460 of FIG. 4. At operation 515, the bit for the current interval is set. The L0 or L1 bits are set depending on whether the log interval number is odd or even as previously described. At operation 520 mirror memory storage is allocated. For example, a mirror memory block, page, line, or the like—depending on the granularity of access. At operation 525, the current value is read from the media and copied to the mirror storage and a pointer to the mirror storage is placed in the metadata for the memory location being written (that was identified at operation 430 from FIG. 4). At operation 530, the write is sent to the media. As previously noted, in some examples, the mirror block may store the newly received value (e.g., the value received at 410). In these examples, subsequent reads or writes to this memory location will use the value in the mirror block (e.g., a logical to physical mapping may be updated or metadata may be updated to ensure the correct block is read). The value for the previous interval may remain in the original memory location and may be later read by the logging process. Once the value of the original memory location is read and logged, that location may be freed.

Figure 6:
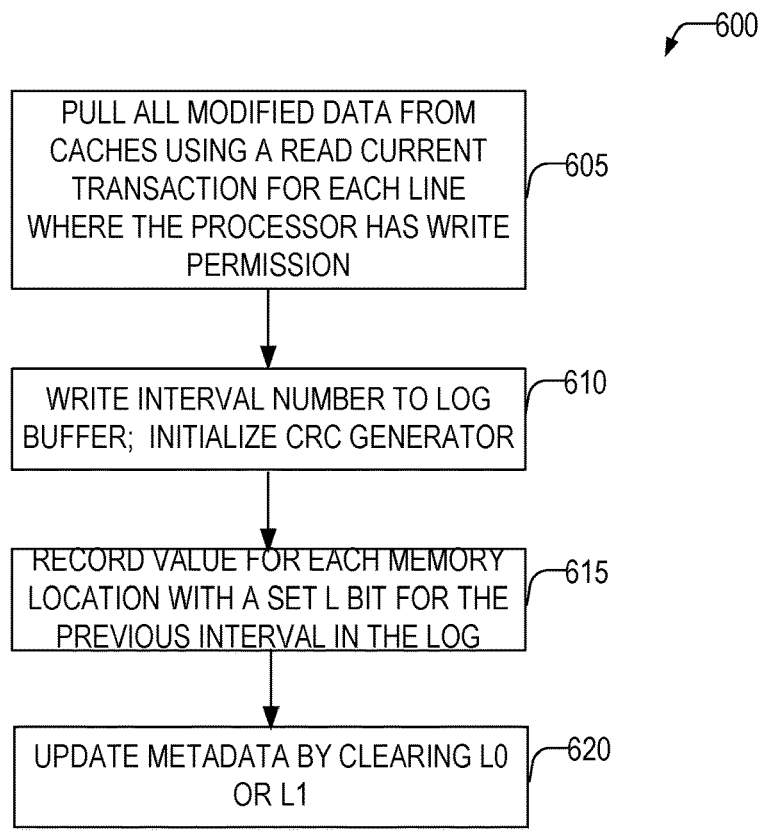
FIG. 6 illustrates a flowchart of a method of a logger iterating through memory locations to generate a log according to some examples of the present disclosure.

FIG. 6 illustrates a flowchart of a method 600 of a logger iterating through memory locations to generate a log according to some examples of the present disclosure. At operation 605, the logger may pull all modified data from caches using a read current transaction command for each memory location where the processor has write permission. At operation 610, the logger may initialize the log by writing the interval number to the log buffer and initialize the CRC generator. At operation 615, the logger may record the value for each memory location with a set bit for the interval that is being logged. The value may be from the current memory location, or a mirrored location if the pointer in the metadata points to a valid value or if both logging indicator bits (L0 and L1) are set. Upon writing the log, the logger may update the metadata at operation 620 to clear the bit for the interval that is being logged (either L0 or L1).

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be in the form of a memory device, host device (such as a personal computer (PC), a tablet PC, a set-top box (STB), a personal digital assistant (PDA), a mobile telephone, a smart phone, a web appliance, a network router, switch or bridge), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The components of FIG. 7 are exemplary and fewer or additional components may be present in a memory device, a host device, or the like. One or more components of FIG. 7 may be configured to execute the timeline of FIG. 2, store the data of FIG. 3, perform the methods of FIGS. 4-6 and be configured to implement host system 110 and/or memory device 120.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 700 may include one or more hardware processors, such as processor 702. Processor 702 may be a central processing unit (CPU), a graphics processing unit (GPU), a hardware processor core, or any combination thereof. Machine 700 may include a main memory 704 and a static memory 706, some or all of which may communicate with each other via an interlink (e.g., bus) 708. Examples of main memory 704 may include Synchronous Dynamic Random-Access Memory (SDRAM), such as Double Data Rate memory, such as DDR4 or DDR5. Interlink 708 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Other Notes and Examples

Example 1 is a method comprising: receiving, from an application, an indication of a start of a logging interval corresponding to a set of one or more memory locations of a memory device; responsive to receiving the indication of the start of the logging interval: receiving a write request for a first memory location in the set of one or more memory locations of the memory device, the write request including a first value to write at the first memory location; responsive to the write request: determining that a second value was written to the first memory location in a previous logging interval and the second value has not yet been recorded to a log corresponding to the previous logging interval; responsive to determining that a second value was written to the first memory location in a previous logging interval and the second value has not yet been recorded to a log corresponding to the previous logging interval: allocating a second memory location of the memory device; processing the write request to write the first value into the first or the second memory location; storing the second value in the other of the first or second memory location; and updating metadata corresponding to the first memory location to indicate that a write operation was performed in the logging interval; and during the logging interval and while the memory device is handling memory device commands, logging values of a set of one or more modified memory locations of the memory device in a log structure, the set of one or more modified memory locations being memory locations where data changed during the previous logging interval, the set of one or more modified memory locations comprising the first memory location, the logging of the first memory location comprising saving the value stored in the first or second locations that was not used to process a write request in the logging interval.

In Example 2, the subject matter of Example 1 includes, wherein the memory device supports a persistent memory model and is connected to a host across link that supports coherency.

In Example 3, the subject matter of Examples 1-2 includes, receiving a memory location of the log from a host device.

In Example 4, the subject matter of Examples 1-3 includes, responsive to determining that the second value was written to the first memory location in the previous logging interval and the second value has not yet been recorded to a log corresponding to the previous logging interval: storing a pointer to the second memory location in the metadata.

In Example 5, the subject matter of Examples 1-4 includes, wherein the metadata includes two flags, a first flag for an even numbered interval and a second flag for an odd numbered interval and wherein updating the metadata corresponding to the first memory location to indicate that the write operation was performed in the logging interval comprises updating the corresponding first or second flag depending on whether the logging interval is even or odd.

In Example 6, the subject matter of Example 5 includes, wherein determining that the second value was written to the first memory location in the previous logging interval and the second value has not yet been recorded to a log corresponding to the previous logging interval comprises: identifying that the first flag is set when a current interval is odd or that the second flag is set when the current interval is even.

In Example 7, the subject matter of Examples 1-6 includes, deallocating the first or second memory location upon logging the value in the first or second memory location.

In Example 8, the subject matter of Examples 1-7 includes, receiving an indication that the logging interval has ended; prior to a second indication that a second logging interval has begun, logging values of a second set of one or more modified memory locations of the memory device in a second log structure, the second set of one or more modified memory locations being memory locations where data changed during the logging interval.

Example 9 is a memory device comprising: a memory controller, configured to perform operations comprising: receiving, from an application, an indication of a start of a logging interval corresponding to a set of one or more memory locations of the memory device; responsive to receiving the indication of the start of the logging interval: receiving a write request for a first memory location in the set of one or more memory locations of the memory device, the write request including a first value to write at the first memory location; responsive to the write request: determining that a second value was written to the first memory location in a previous logging interval and the second value has not yet been recorded to a log corresponding to the previous logging interval; responsive to determining that a second value was written to the first memory location in the previous logging interval and the second value has not yet been recorded to a log corresponding to the previous logging interval: allocating a second memory location of the memory device; processing the write request to write the first value into the first or the second memory location; storing the second value in the other of the first or second memory location; and updating metadata corresponding to the first memory location to indicate that a write operation was performed in the logging interval; and during the logging interval and while the memory device is handling memory device commands, logging values of a set of one or more modified memory locations of the memory device in a log structure, the set of one or more modified memory locations being memory locations where data changed during the previous logging interval, the set of one or more modified memory locations comprising the first memory location, the logging of the first memory location comprising saving the value stored in the first or second locations that was not used to process a write request in the logging interval.

In Example 10, the subject matter of Example 9 includes, wherein the memory device supports a persistent memory model and is connected to a host across link that supports coherency.

In Example 11, the subject matter of Examples 9-10 includes, wherein the operations further comprise receiving a memory location of the log from a host device.

In Example 12, the subject matter of Examples 9-11 includes, wherein the operations further comprise responsive to determining that the second value was written to the first memory location in the previous logging interval and the second value has not yet been recorded to a log corresponding to the previous logging interval: storing a pointer to the second memory location in the metadata.

In Example 13, the subject matter of Examples 9-12 includes, wherein the metadata includes two flags, a first flag for an even numbered interval and a second flag for an odd numbered interval and wherein the operations of updating the metadata corresponding to the first memory location to indicate that the write operation was performed in the logging interval comprises updating the corresponding first or second flag depending on whether the logging interval is even or odd.

In Example 14, the subject matter of Example 13 includes, wherein the operations of determining that the second value was written to the first memory location in the previous logging interval and the second value has not yet been recorded to a log corresponding to the previous logging interval comprises: identifying that the first flag is set when a current interval is odd or that the second flag is set when the current interval is even.

In Example 15, the subject matter of Examples 9-14 includes, wherein the operations further comprise deallocating the first or second memory location upon logging the value in the first or second memory location.

In Example 16, the subject matter of Examples 9-15 includes, wherein the operations further comprise: receiving an indication that the logging interval has ended; prior to a second indication that a second logging interval has begun, logging values of a second set of one or more modified memory locations of the memory device in a second log structure, the second set of one or more modified memory locations being memory locations where data changed during the logging interval.

Example 17 is a non-transitory machine-readable medium, storing instructions, which when executed by a memory controller of a memory device, performs operations comprising: receiving, from an application, an indication of a start of a logging interval corresponding to a set of one or more memory locations of the memory device; responsive to receiving the indication of the start of the logging interval: receiving a write request for a first memory location in the set of one or more memory locations of the memory device, the write request including a first value to write at the first memory location; responsive to the write request: determining that a second value was written to the first memory location in a previous logging interval and the second value has not yet been recorded to a log corresponding to the previous logging interval; responsive to determining that the second value was written to the first memory location in the previous logging interval and the second value has not yet been recorded to a log corresponding to the previous logging interval: allocating a second memory location of the memory device; processing the write request to write the first value into the first or the second memory location; storing the second value in the other of the first or second memory location; and updating metadata corresponding to the first memory location to indicate that a write operation was performed in the logging interval; and during the logging interval and while the memory device is handling memory device commands, logging values of a set of one or more modified memory locations of the memory device in a log structure, the set of one or more modified memory locations being memory locations where data changed during the previous logging interval, the set of one or more modified memory locations comprising the first memory location, the logging of the first memory location comprising saving the value stored in the first or second locations that was not used to process a write request in the logging interval.

In Example 18, the subject matter of Example 17 includes, wherein the memory device supports a persistent memory model and is connected to a host across link that supports coherency.

In Example 19, the subject matter of Examples 17-18 includes, wherein the operations further comprise receiving a memory location of the log from a host device.

In Example 20, the subject matter of Examples 17-19 includes, wherein the operations further comprise responsive to determining that the second value was written to the first memory location in the previous logging interval and the second value has not yet been recorded to a log corresponding to the previous logging interval: storing a pointer to the second memory location in the metadata.

In Example 21, the subject matter of Examples 17-20 includes, wherein the metadata includes two flags, a first flag for an even numbered interval and a second flag for an odd numbered interval and wherein the operations of updating the metadata corresponding to the first memory location to indicate that the write operation was performed in the logging interval comprises updating the corresponding first or second flag depending on whether the logging interval is even or odd.

In Example 22, the subject matter of Example 21 includes, wherein the operations of determining that the second value was written to the first memory location in the previous logging interval and the second value has not yet been recorded to a log corresponding to the previous logging interval comprises: identifying that the first flag is set when a current interval is odd or that the second flag is set when the current interval is even.

In Example 23, the subject matter of Examples 17-22 includes, wherein the operations further comprise deallocating the first or second memory location upon logging the value in the first or second memory location.

In Example 24, the subject matter of Examples 17-23 includes, wherein the operations further comprise: receiving an indication that the logging interval has ended; prior to a second indication that a second logging interval has begun, logging values of a second set of one or more modified memory locations of the memory device in a second log structure, the second set of one or more modified memory locations being memory locations where data changed during the logging interval.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

What is claimed is:

1. A method comprising:
receiving, from an application, an indication of a start of a logging interval corresponding to a set of one or more memory locations of a memory device;
responsive to receiving the indication of the start of the logging interval:
receiving a write request for a first memory location in the set of one or more memory locations of the memory device, the write request including a first value to write at the first memory location;
responsive to the write request:
determining that a second value was written to the first memory location in a previous logging interval and the second value has not yet been recorded to a log corresponding to the previous logging interval;
responsive to determining that a second value was written to the first memory location in a previous logging interval and the second value has not yet been recorded to a log corresponding to the previous logging interval:
allocating a second memory location of the memory device;
processing the write request to write the first value into the first or the second memory location;
storing the second value in the other of the first or second memory location; and
updating metadata corresponding to the first memory location to indicate that a write operation was performed in the logging interval; and
during the logging interval and while the memory device is handling memory device commands, logging values of a set of one or more modified memory locations of the memory device in a log structure, the set of one or more modified memory locations being memory locations where data changed during the previous logging interval, the set of one or more modified memory locations comprising the first memory location, the logging of the first memory location comprising saving the value stored in the first or second locations that was not used to process a write request in the logging interval.

2. The method of claim 1, wherein the memory device supports a persistent memory model and is connected to a host across link that supports coherency.

3. The method of claim 1, further comprising receiving a memory location of the log from a host device.

4. The method of claim 1, further comprising responsive to determining that the second value was written to the first memory location in the previous logging interval and the second value has not yet been recorded to a log corresponding to the previous logging interval:
storing a pointer to the second memory location in the metadata.

5. The method of claim 1, wherein the metadata includes two flags, a first flag for an even numbered interval and a second flag for an odd numbered interval and wherein updating the metadata corresponding to the first memory location to indicate that the write operation was performed in the logging interval comprises updating the corresponding first or second flag depending on whether the logging interval is even or odd.

6. The method of claim 5, wherein determining that the second value was written to the first memory location in the previous logging interval and the second value has not yet been recorded to a log corresponding to the previous logging interval comprises:
identifying that the first flag is set when a current interval is odd or that the second flag is set when the current interval is even.

7. The method of claim 1, further comprising deallocating the first or second memory location upon logging the value in the first or second memory location.

8. The method of claim 1, further comprising:
receiving an indication that the logging interval has ended;
prior to a second indication that a second logging interval has begun, logging values of a second set of one or more modified memory locations of the memory device in a second log structure, the second set of one or more modified memory locations being memory locations where data changed during the logging interval.

9. A memory device comprising:
a memory controller, configured to perform operations comprising:
receiving, from an application, an indication of a start of a logging interval corresponding to a set of one or more memory locations of the memory device;
responsive to receiving the indication of the start of the logging interval:
receiving a write request for a first memory location in the set of one or more memory locations of the memory device, the write request including a first value to write at the first memory location;
responsive to the write request:
determining that a second value was written to the first memory location in a previous logging interval and the second value has not yet been recorded to a log corresponding to the previous logging interval;
responsive to determining that a second value was written to the first memory location in the previous logging interval and the second value has not yet been recorded to a log corresponding to the previous logging interval:
allocating a second memory location of the memory device;
processing the write request to write the first value into the first or the second memory location;
storing the second value in the other of the first or second memory location; and
updating metadata corresponding to the first memory location to indicate that a write operation was performed in the logging interval; and
during the logging interval and while the memory device is handling memory device commands, logging values of a set of one or more modified memory locations of the memory device in a log structure, the set of one or more modified memory locations being memory locations where data changed during the previous logging interval, the set of one or more modified memory locations comprising the first memory location, the logging of the first memory location comprising saving the value stored in the first or second locations that was not used to process a write request in the logging interval.

10. The memory device of claim 9, wherein the memory device supports a persistent memory model and is connected to a host across link that supports coherency.

11. The memory device of claim 9, wherein the operations further comprise receiving a memory location of the log from a host device.

12. The memory device of claim 9, wherein the operations further comprise responsive to determining that the second value was written to the first memory location in the previous logging interval and the second value has not yet been recorded to a log corresponding to the previous logging interval:
storing a pointer to the second memory location in the metadata.

13. The memory device of claim 9, wherein the metadata includes two flags, a first flag for an even numbered interval and a second flag for an odd numbered interval and wherein the operations of updating the metadata corresponding to the first memory location to indicate that the write operation was performed in the logging interval comprises updating the corresponding first or second flag depending on whether the logging interval is even or odd.

14. The memory device of claim 13, wherein the operations of determining that the second value was written to the first memory location in the previous logging interval and the second value has not yet been recorded to a log corresponding to the previous logging interval comprises:
identifying that the first flag is set when a current interval is odd or that the second flag is set when the current interval is even.

15. The memory device of claim 9, wherein the operations further comprise deallocating the first or second memory location upon logging the value in the first or second memory location.

16. The memory device of claim 9, wherein the operations further comprise:
receiving an indication that the logging interval has ended;
prior to a second indication that a second logging interval has begun, logging values of a second set of one or more modified memory locations of the memory device in a second log structure, the second set of one or more modified memory locations being memory locations where data changed during the logging interval.

17. A non-transitory machine-readable medium, storing instructions, which when executed by a memory controller of a memory device, performs operations comprising:
    receiving, from an application, an indication of a start of a logging interval corresponding to a set of one or more memory locations of the memory device;
    responsive to receiving the indication of the start of the logging interval:
        receiving a write request for a first memory location in the set of one or more memory locations of the memory device, the write request including a first value to write at the first memory location;
        responsive to the write request:
            determining that a second value was written to the first memory location in a previous logging interval and the second value has not yet been recorded to a log corresponding to the previous logging interval;
            responsive to determining that the second value was written to the first memory location in the previous logging interval and the second value has not yet been recorded to a log corresponding to the previous logging interval:
                allocating a second memory location of the memory device;
                processing the write request to write the first value into the first or the second memory location;
                storing the second value in the other of the first or second memory location; and
                updating metadata corresponding to the first memory location to indicate that a write operation was performed in the logging interval; and
        during the logging interval and while the memory device is handling memory device commands, logging values of a set of one or more modified memory locations of the memory device in a log structure, the set of one or more modified memory locations being memory locations where data changed during the previous logging interval, the set of one or more modified memory locations comprising the first memory location, the logging of the first memory location comprising saving the value stored in the first or second locations that was not used to process a write request in the logging interval.

18. The non-transitory machine-readable medium of claim 17, wherein the memory device supports a persistent memory model and is connected to a host across link that supports coherency.

19. The non-transitory machine-readable medium of claim 17, wherein the operations further comprise receiving a memory location of the log from a host device.

20. The non-transitory machine-readable medium of claim 17, wherein the operations further comprise responsive to determining that the second value was written to the first memory location in the previous logging interval and the second value has not yet been recorded to a log corresponding to the previous logging interval:
    storing a pointer to the second memory location in the metadata.

21. The non-transitory machine-readable medium of claim 17, wherein the metadata includes two flags, a first flag for an even numbered interval and a second flag for an odd numbered interval and wherein the operations of updating the metadata corresponding to the first memory location to indicate that the write operation was performed in the logging interval comprises updating the corresponding first or second flag depending on whether the logging interval is even or odd.

22. The non-transitory machine-readable medium of claim 21, wherein the operations of determining that the second value was written to the first memory location in the previous logging interval and the second value has not yet been recorded to a log corresponding to the previous logging interval comprises:
    identifying that the first flag is set when a current interval is odd or that the second flag is set when the current interval is even.

23. The non-transitory machine-readable medium of claim 17, wherein the operations further comprise deallocating the first or second memory location upon logging the value in the first or second memory location.

24. The non-transitory machine-readable medium of claim 17, wherein the operations further comprise:
    receiving an indication that the logging interval has ended;
    prior to a second indication that a second logging interval has begun, logging values of a second set of one or more modified memory locations of the memory device in a second log structure, the second set of one or more modified memory locations being memory locations where data changed during the logging interval.

\* \* \* \* \*